United States Patent
Kim et al.

(10) Patent No.: US 11,777,094 B2
(45) Date of Patent: Oct. 3, 2023

(54) COMPOSITE BINDER COMPOSITION FOR ALL-SOLID-STATE BATTERY, ELECTRODE SLURRY COMPRISING SAME, AND METHOD OF MANUFACTURING ELECTRODE FOR ALL-SOLID-STATE BATTERY USING ELECTRODE SLURRY

(71) Applicants: HYUNDAI MOTOR COMPANY, Seoul (KR); KIA CORPORATION, Seoul (KR); Seoul National University R&DB Foundation, Seoul (KR)

(72) Inventors: Sang Mo Kim, Hwaseong-si (KR); Tae Young Kwon, Anyang-si (KR); Ju Yeon Lee, Hwaseong-si (KR); Sung Hoo Jung, Hwaseong-si (KR); Jang Wook Choi, Seoul (KR); Ji Eun Lee, Seongnam-si (KR)

(73) Assignees: Hyundai Motor Company, Seoul (KR); Kia Corporation, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 17/332,413

(22) Filed: May 27, 2021

(65) Prior Publication Data
US 2022/0037665 A1  Feb. 3, 2022

(30) Foreign Application Priority Data
Jul. 28, 2020 (KR) .......... 10-2020-0093552

(51) Int. Cl.
*H01B 1/24* (2006.01)
*H01M 4/60* (2006.01)
(Continued)

(52) U.S. Cl.
CPC ............. *H01M 4/622* (2013.01); *C08L 33/10* (2013.01); *C08L 33/12* (2013.01); *C08L 47/00* (2013.01);
(Continued)

(58) Field of Classification Search
CPC ........ H01B 1/00; H01B 1/24; H01M 4/0416; H01M 4/622; H01M 4/505; H01M 4/525; C08L 33/10
See application file for complete search history.

(56) References Cited

U.S. PATENT DOCUMENTS 10,418,632 B2 *  9/2019  Park ................. H01M 50/417
2018/0316051 A1 * 11/2018  Lee .................. H01M 4/405
(Continued)

FOREIGN PATENT DOCUMENTS

| KR | 10-2016-0051877 A | 5/2016 |
| KR | 10-1664526 B | 10/2016 |
| KR | 10-2017-0032207 A | 3/2017 |

OTHER PUBLICATIONS

Lee et al "In situ deprotection of polymeric binders for solution-processible sulfide-based all-solid-state batteries", Adv. Mater. 2020, 32, 2001702.*
(Continued)

*Primary Examiner* — Mark Kopec
(74) *Attorney, Agent, or Firm* — Morgan, Lewis & Bockius LLP (57) ABSTRACT

A composite binder composition for an all-solid-state battery includes: a first polymer comprising a repeating structure represented by Chemical Formula 1a or Chemical Formula 1b below, and a second polymer comprising at least one selected from a group consisting of diene-based rubber, polysiloxane, and combinations thereof:
(Continued)

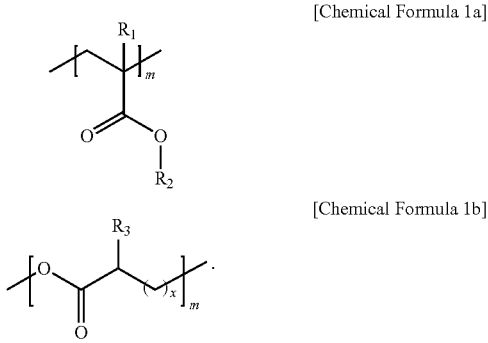

[Chemical Formula 1a]

[Chemical Formula 1b]

10 Claims, 6 Drawing Sheets (51) Int. Cl.
*H01M 4/62* (2006.01)
*C08L 33/10* (2006.01)
*C08L 33/12* (2006.01)
*C08L 47/00* (2006.01)
*H01M 4/505* (2010.01)
*H01M 4/04* (2006.01)
*H01M 4/1391* (2010.01)
*H01M 10/0525* (2010.01)
*H01M 4/525* (2010.01)

(52) U.S. Cl.
CPC ............ *H01B 1/24* (2013.01); *H01M 4/0416* (2013.01); *H01M 4/1391* (2013.01); *H01M 4/505* (2013.01); *H01M 4/525* (2013.01); *H01M 4/625* (2013.01); *H01M 10/0525* (2013.01); *C08L 2203/20* (2013.01)

(56) References Cited

U.S. PATENT DOCUMENTS

2020/0058940 A1* 2/2020 Kim ................ H01M 10/058
2020/0144599 A1* 5/2020 Lee ................ H01M 4/134
2021/0194039 A1* 6/2021 Burdynska ............ C08L 9/02

OTHER PUBLICATIONS

Yang et al "Cross-linked siloxane-based copolymer binder with combined hardness and softness for stable silicon anodes in Li-ion batteries", J Mater Sci (2021) 56:20126-20137.*

Edwards et al "Raman and FTIR spectroscopic studies of copolymers of methyl methacrylate with butadiene", Spectrochimica Acta Part A: Molecular Spectroscopy 49(4), Apr. 1993, pp. 457-464.*

Germack et al "RAFT-based synthesis and characterization of ABC versus ACB triblock copolymers containing tert-butyl acrylate, isoprene, and styrene blocks", Macromol. Chem. Phys. 2007, 208, 2481-2491.*

Morandi et al "Synthesis of brush copolymers based on a poly(1,4-butadiene) backbone via the "grafting from" approach . . . ", Macromolecules 2009, 42, 6927-6931.*

Leclere et al "Microdomain morphology analysis of block copolymers by atomic force microscopy with phase detection imaging", Langmuir 1996, 12, 4317-4320.*

* cited by examiner

COMPOSITE BINDER COMPOSITION FOR ALL-SOLID-STATE BATTERY, ELECTRODE SLURRY COMPRISING SAME, AND METHOD OF MANUFACTURING ELECTRODE FOR ALL-SOLID-STATE BATTERY USING ELECTRODE SLURRY

CROSS REFERENCE TO RELATED APPLICATION

This application claims priority to and the benefit of Korean Patent Application No. 10-2020-0093552, filed on Jul. 28, 2020, the entire content of which are incorporated herein by reference.

FIELD

The present disclosure relates to a composite binder composition for an all-solid-state battery.

BACKGROUND

The statements in this section merely provide background information related to the present disclosure and may not constitute prior art.

Recently, ignition and explosion accidents due to the use of liquid electrolytes have been frequently reported in connection with lithium secondary batteries, and interest in battery safety is increasing. Accordingly, all-solid-state batteries using solid electrolytes instead of liquid electrolytes are receiving attention. All-solid-state batteries also have advantages in battery performance such as safety, high energy density, high output, a long lifetime, and the like.

However, since all-solid-state batteries are based on a dry process, the manufacturing process thereof is complicated and price competitiveness is low, so there is a limit to marketability. In order to apply a wet process to an all-solid-state battery, it is essential to introduce a binder for increasing binding strength between electrode materials. In particular, it is desirable that a binder for all-solid-state batteries does not react with a highly reactive solid electrolyte, and yet exhibit superior binding strength even when added in a small amount.

Meanwhile, solid electrolytes for all-solid-state batteries include oxide-based solid electrolytes and sulfide-based solid electrolytes. Here, sulfide-based solid electrolytes have higher lithium ionic conductivity, and sulfide-based solid electrolytes have high reactivity with polar compounds. In order to suppress the reaction of the sulfide-based solid electrolyte and dissolve or disperse the same in a non-polar processing solvent, the all-solid-state battery using the sulfide-based solid electrolyte mainly includes a non-polar binder having low polarity, such as a rubber-based polymer, an acrylate-based polymer, etc. However, since the non-polar binder does not contain a polar functional group that imparts adhesion, adhesion of the electrode or solid electrolyte layer using the same is inferior compared to when using a polar binder.

SUMMARY

The present disclosure provides a binder composition capable of conferring superior adhesion without reacting with a sulfide-based solid electrolyte.

The present disclosure provides a binder composition capable of conferring flexibility to an electrode and/or a solid electrolyte layer.

One form of the present disclosure provides a binder composition for an all-solid-state battery, including: a first polymer including a repeating structure represented by Chemical Formula 1a or Chemical Formula 1b below; and a second polymer including at least one selected from the group consisting of diene-based rubber, polysiloxane, and combinations thereof:

[Chemical Formula 1a]

[Chemical Formula 1b]

wherein in Chemical Formula 1a, $R_1$ includes hydrogen, a halogen element or a C1-4 alkyl group, $R_2$ includes an unsubstituted C1-4 alkyl group or an ether group in which a portion of carbon atoms of the alkyl group is substituted with oxygen, and m is an integer of 40 to 2,000; and in Chemical Formula 1b, $R_3$ includes hydrogen, a halogen element or a C1-4 alkyl group, x is an integer of 0 to 6, and m is an integer of 40 to 2,000.

The diene-based rubber may include at least one selected from the group consisting of 1,4-polybutadiene, 1,2-polybutadiene, cis-1,4-polyisoprene, trans-1,4-polyisoprene, derivatives thereof substituted with a C1-3 alkyl group, and combinations thereof.

The polysiloxane may include at least one selected from the group consisting of polydimethylsiloxane, polydiethylsiloxane, polydipropylsiloxane, polyvinylsiloxane, and combinations thereof.

The binder composition may be a mixture of the first polymer and the second polymer.

The binder composition may be a mixture including 50 wt % or less but exceeding 0 wt % of the first polymer and 50 wt % to less than 100 wt % of the second polymer.

The binder composition may be a copolymer of the first polymer and the second polymer.

The binder composition may be a block copolymer of the first polymer and the second polymer.

The binder composition may be obtained by copolymerizing 50 mol % or less but exceeding 0 mol % of the first polymer and 50 mol % to less than 100 mol % of the second polymer.

The binder composition may be represented by Chemical Formula 2 below:

[Chemical Formula 2]

wherein in Chemical Formula 2, m is an integer of 40 to 2,000, and n is an integer of 1,500 to 15,000.

The binder composition may be represented by Chemical Formula 3 below:

[Chemical Formula 3]

wherein in Chemical Formula 3, m is an integer of 40 to 2,000, and n is an integer of 1,500 to 15,000.

Another form of the present disclosure provides an electrode slurry for an all-solid-state battery, the electrode slurry including: a binder solution including the binder composition described above and a solvent; an electrode active material; a conductive material; and a solid electrolyte.

The solvent may include at least one selected from the group consisting of butylate, toluene, xylene, anisole, hexane, heptane, dibromomethane, dichloroethane, dichlorohexane, ethanol, glycol ether, and combinations thereof.

The binder solution may include 2.5 wt % to 45 wt % of the binder composition and 97.5 wt % to 55 wt % of the solvent.

The electrode slurry may include 0.1 wt % to 10 wt % of the binder solution, 75 wt % to 95 wt % of the electrode active material, 1 wt % to 10 wt % of the conductive material, and 5 wt % to 25 wt % of the solid electrolyte.

Still another form of the present disclosure provides a method of manufacturing an electrode for an all-solid-state battery, the method including: preparing a binder solution including the binder composition described above and a solvent; manufacturing an electrode slurry by mixing the binder solution, an electrode active material, a conductive material, and a solid electrolyte; and forming an electrode by applying the electrode slurry on a substrate and performing heat treatment.

The applied electrode slurry may be heat-treated at a temperature of 100° C. to 250° C. for 1 min to 15 hr.

According to the present disclosure, it is possible to obtain a binder composition capable of conferring superior adhesion without reacting with a sulfide-based solid electrolyte.

Also, according to the present disclosure, it is possible to obtain a binder composition capable of conferring flexibility to an electrode and/or a solid electrolyte layer.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

The present disclosure pertains to a binder solution for an all-solid-state battery, an electrode slurry including the same, and a method of manufacturing an electrode for an all-solid-state battery using the electrode slurry.

As described above, conventional all-solid-state batteries are mainly manufactured through a complicated dry process, so the price competitiveness thereof is low. Meanwhile, in order to apply an inexpensive wet process to a method of manufacturing an all-solid-state battery, it is important to select a binder composition that does not react with a sulfide-based solid electrolyte, is chemically stable, and has superior binding strength.

Since the binder composition for an all-solid-state battery according to the present disclosure contains both a polar functional group and a rubber-based functional group, it is strongly adhered to the surface of the electrode material, solid electrolyte, etc., and simultaneously, the flexibility of the electrode and the solid electrolyte layer may also be improved.

In addition, the electrode for an all-solid-state battery according to the present disclosure contains a binder solution that has superior stability and adhesion, so adhesion between electrode materials is superior even when the binder is contained in a minimum amount in the electrode, thus improving battery performance.

In addition, the all-solid-state battery according to the present disclosure enables a wet process using an electrode slurry instead of the existing dry process, thereby reducing manufacturing costs and also providing battery performance having high energy density and high output.

The binder composition according to the present disclosure may include a first polymer including a repeating structure represented by Chemical Formula 1a or Chemical Formula 1b below and a second polymer including at least one selected from the group consisting of diene-based rubber, polysiloxane, and combinations thereof:

[Chemical Formula 1a]

[Chemical Formula 1b]

In Chemical Formula 1a, $R_1$ may include hydrogen, a halogen element or a C1-4 alkyl group, may include an unsubstituted C1-4 alkyl group or an ether group in which a portion of carbon atoms of the alkyl group may be substituted with oxygen, and m may be an integer of 40 to 2,000.

In Chemical Formula 1b, R may include hydrogen, a halogen element or a C1-4 alkyl group, x may be an integer of 0 to 6, and m may be an integer of 40 to 2,000.

The first polymer may include an ester group in the side chain of the repeating structure, as represented in Chemical Formula 1a, or may include an ester group in the main chain of the repeating structure, as represented in Chemical Formula 1b.

The ester group may serve to confer superior adhesion by inducing a polar-polar interaction between the binder composition and at least one of the electrode active material, the solid electrolyte and the conductive material.

The second polymer is a rubber-based polymer, and may include at least one selected from the group consisting of diene-based rubber, polysiloxane, and combinations thereof. The second polymer is able to increase the flexibility of the electrode and/or the solid electrolyte layer. Ultimately, the binder composition may inhibit breakage of electrodes by dispersing the internal stresses of thick electrodes, etc.

The diene-based rubber may include at least one selected from the group consisting of 1,4-polybutadiene, 1,2-polybutadiene, cis-1,4-polyisoprene, trans-1,4-polyisoprene, derivatives thereof substituted with a C1-3 alkyl group, and combinations thereof. The derivative may be a form in which at least one carbon atom of diene-based rubber such as 1,4-polybutadiene, etc. is substituted with a C1-3 alkyl group.

The polysiloxane may include at least one selected from the group consisting of polydimethylsiloxane, polydiethylsiloxane, polydipropylsiloxane, polyvinylsiloxane, and combinations thereof.

Since the binder composition has low polarity, it is thoroughly dispersed in a non-polar solvent group and may inhibit a chemical reaction from occurring between electrode materials in the electrode slurry.

The binder composition may be a mixture of the first polymer and the second polymer. Here, the binder composition may include 50 wt % or less but exceeding 0 wt % of the first polymer; and 50 wt % to less than 100 wt % of the second polymer. When the amounts of the first polymer and the second polymer fall within the above numerical ranges, adhesion and flexibility may be increased to desired levels.

Also, the binder composition may be a copolymer in which the first polymer and the second polymer are copolymerized. Preferably, the binder composition is a block copolymer of the first polymer and the second polymer. Here, the binder composition may be obtained by copolymerizing 50 mall or less but exceeding 0 mol % of the first polymer and 50 mol % to less than 100 mol % of the second polymer. When the amounts of the first polymer and the second polymer fall within the above numerical ranges, adhesion and flexibility may be increased to desired levels.

The binder composition may include at least one selected from among Chemical Formula 2 to Chemical Formula 17 below:

[Chemical Formula 2]

[Chemical Formula 3]

[Chemical Formula 4]

[Chemical Formula 5]

[Chemical Formula 6]

[Chemical Formula 7]

[Chemical Formula 8]

[Chemical Formula 9]

[Chemical Formula 10]

[Chemical Formula 11]

[Chemical Formula 12]

[Chemical Formula 13]

[Chemical Formula 14]

[Chemical Formula 15]

[Chemical Formula 16]

[Chemical Formula 17]

In Chemical Formula 2 to Chemical Formula 17, m may be an integer of 40 to 2,000, and n may be an integer of 1,500 to 15,000.

An electrode slurry according to the present disclosure may include a binder solution including the binder composition described above and a solvent; an electrode active material; a conductive material; and a solid electrolyte.

The binder composition is as described above, and a description thereof will be omitted below.

The solvent may include at least one selected from the group consisting of butylate, toluene, xylene, anisole, hexane, heptane, dibromomethane, dichloroethane, dichlorohexane, ethanol, glycol ether, and combinations thereof.

The binder solution may include 2.5 wt % to 45 wt % of the binder composition and 97.5 wt % to 55 wt % of the solvent. If the amount of the binder composition is less than 2.5 wt %, it may be difficult to adjust the viscosity of the slurry. On the other hand, if the amount of the binder composition exceeds 45 wt %, the binder composition may not be uniformly dispersed.

The electrode active material may be a cathode active material or an anode active material.

The cathode active material is not particularly limited, but examples thereof may include an oxide active material and a sulfide active material.

The oxide active material may be a rock-salt-layer-type active material such as $LiCoO_2$, $LiMnO_2$, $LiNiO_2$, $LiVO_2$, $Li_{1+x}Ni_{1/3}Co_{1/3}Mn_{1/3}O_2$ or the like, a spinel-type active material such as $LiMn_2O_4$, $Li(Ni_{0.5}Mn_{1.5})O_4$ or the like, an inverse-spinel-type active material such as $LiNiVO_4$, $LiCoVO_4$ or the like, an olivine-type active material such as $LiFePO_4$, $LiMnPO_4$, $LiCoPO_4$, $LiNiPO_4$ or the like, a silicon-containing active material such as $Li_2FeSiO_4$, $Li_2MnSiO_4$ or the like, a rock-salt-layer-type active material in which a portion of a transition metal is substituted with a different metal, such as $LiNi_{0.8}Co_{(0.2-x)}Al_xO_2$ ($0<x<0.2$), a spinel-type active material in which a portion of a transition metal is substituted with a different metal, such as $Li_{1+x}Mn_{2-x-y}M_yO_4$ (M being at least one of Al, Mg, Co, Fe, Ni and Zn, $0<x+y<2$), or lithium titanate such as $Li_4Ti_5O_{12}$ or the like.

The sulfide active material may be copper chevrel, iron sulfide, cobalt sulfide, nickel sulfide, etc.

The anode active material is not particularly limited, but examples thereof may include a carbon active material and a metal active material.

The carbon active material may be graphite such as mesocarbon microbeads (MCMB), highly oriented pyrolytic graphite (HOPG), etc., or amorphous carbon such as hard carbon and soft carbon.

The metal active material may be In, Al, Si, Sn or an alloy containing at least one element thereof.

The conductive material functions to form an electron-conducting path in the electrode. The conductive material may be $sp^2$ carbon material such as carbon black, conductive graphite, ethylene black, carbon nanotubes, etc., or graphene.

The solid electrolyte may be an oxide-based solid electrolyte or a sulfide-based solid electrolyte. Here, the use of a sulfide-based solid electrolyte, having high lithium ionic conductivity, is preferable.

The sulfide-based solid electrolyte may be $Li_2S—P_2S_5$, $Li_2S—P_2S_5—LiI$, $Li_2S—P_2S_5—LiCl$, $Li_2S—P_2S_5—LiBr$, $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—Z_mS_n$ (in which m and n are positive numbers, and Z is any one of Ge, Zn and Ga), $Li_2S—GeS_2$, $Li_2S—SiS_2—Li_xMO_y$ (in which x and y are positive numbers, and M is any one of P, Si, Ge, B, Al, Ga and In), $Li_{10}GeP_2Si_2$, etc.

The electrode slurry may include 0.1 wt % to 10 wt % of the binder solution, 75 wt % to 95 wt % of the electrode active material, 1 wt % to 10 wt % of the conductive material, and 5 wt % to 25 wt % of the solid electrolyte. If the amount of the binder solution is less than 0.1 wt %, binding strength between the electrode active material, conductive material and solid electrolyte may be deteriorated. On the other hand, if the amount of the binder solution exceeds 10 wt %, electrode resistance may increase due to the binder solution, which may deteriorate electrochemical performance, and no further enhancement in binding strength may be expected.

According to the present disclosure, a method of manufacturing an electrode may include preparing a binder solution including the binder composition described above and a solvent, manufacturing an electrode slurry by mixing the binder solution, an electrode active material, a conductive material and a solid electrolyte, and forming an electrode by applying the electrode slurry on a substrate and performing heat treatment.

The binder solution may be prepared by dissolving or dispersing the binder composition in the solvent.

The heat treatment of the applied electrode slurry may be performed for 1 min to 15 hr at a temperature of 100° C. to 250° C., 150° C. to 180° C., or 150° C. to 160° C. If the heat treatment temperature is higher than 250° C., side reactions within or between the electrode active material, conductive material, and solid electrolyte in the electrode slurry may occur, undesirably causing changes in the material composition.

A better understanding of the present disclosure will be given through the following examples, which are merely set forth to illustrate the present disclosure and are not to be construed as limiting the scope of the present disclosure.

Example 1

The first polymer that was used was poly-tert-butylacrylate having a number average molecular weight of 20,000 g/mol. The second polymer that was used was 1,4-polybutadiene having a number average molecular weight of 130,000 g/mol. The first polymer and the second polymer were polymerized, thus obtaining a binder composition in the form of a block copolymer represented by Chemical Formula 2.

A binder solution was prepared by mixing 10 wt % of the binder composition and 90 wt % of a butylate solvent.

A cathode slurry was prepared by mixing 2 wt % of the binder solution, 74.5 wt % of a cathode active material, 2 wt % of a conductive material and 21.5 wt % of a solid electrolyte. Here, the cathode active material that was used was $LiNi_{0.7}Co_{0.15}Mn_{0.15}O_2$ as a lithium transition metal oxide, the conductive material that was used was carbon black, and the solid electrolyte that was used was $Li_6PS_5Cl$ having an argyrodite crystalline structure as an $Li_2S—P_2S_5—LiCl$-based sulfide solid electrolyte.

The cathode slurry was applied on an aluminum current collector and heat-treated at 150° C. for 3 hr to thus manufacture a cathode.

On the cathode, a solid electrolyte membrane, an anode and an anode current collector were sequentially stacked through a typical process, thereby manufacturing an all-solid-state battery. Here, the solid electrolyte membrane that was used was $Li_6PS_5Cl$ having an argyrodite crystalline structure as a $Li_2S$—$P_2S_5$—LiCl-based sulfide solid electrolyte, and the anode that was used was lithium indium metal. Also, nickel foil was used as the anode current collector.

Example 2

The first polymer that was used was polymethylmethacrylate having a number average molecular weight of 68,000 g/mol. The second polymer that was used was 1,2-polybutadiene having a number average molecular weight of 142,000 g/mol. The first polymer and the second polymer were polymerized, thus obtaining a binder composition in the form of a block copolymer represented by Chemical Formula 3.

With that exception, an all-solid-state battery was manufactured in the same manner as in Example 1.

Comparative Example 1

An all-solid-state battery was manufactured in the same manner as in Example 1, with the exception that a polymethylmethacrylate homopolymer having a number average molecular weight of 160,000 g/mol was used as the binder composition.

Comparative Example 2

An all-solid-state battery was manufactured in the same manner as in Example 1, with the exception that a poly-tert-butyl acrylate homopolymer having a number average molecular weight of 143,000 g/mol was used as the binder composition.

Comparative Example 3

An all-solid-state battery was manufactured in the same manner as in Example 1, with the exception that a 1,4-polybutadiene homopolymer having a number average molecular weight of 200,000 g/mol was used as the binder composition.

Test Example 1

The reactivity of the binder composition and the solid electrolyte was evaluated. The solid electrolyte used for the cathode of Example and Example 2 and the solid electrolyte used for the solid electrolyte membrane are the same as each other, and thus the results of X-ray diffraction and Raman spectroscopy of the solid electrolyte membrane were used as Reference, and the results of X-ray diffraction and Raman spectroscopy of the electrodes of Example 1 and Example 2 were compared with the Reference. The results thereof are shown in FIGS. 1 and 2.

Figure 1:
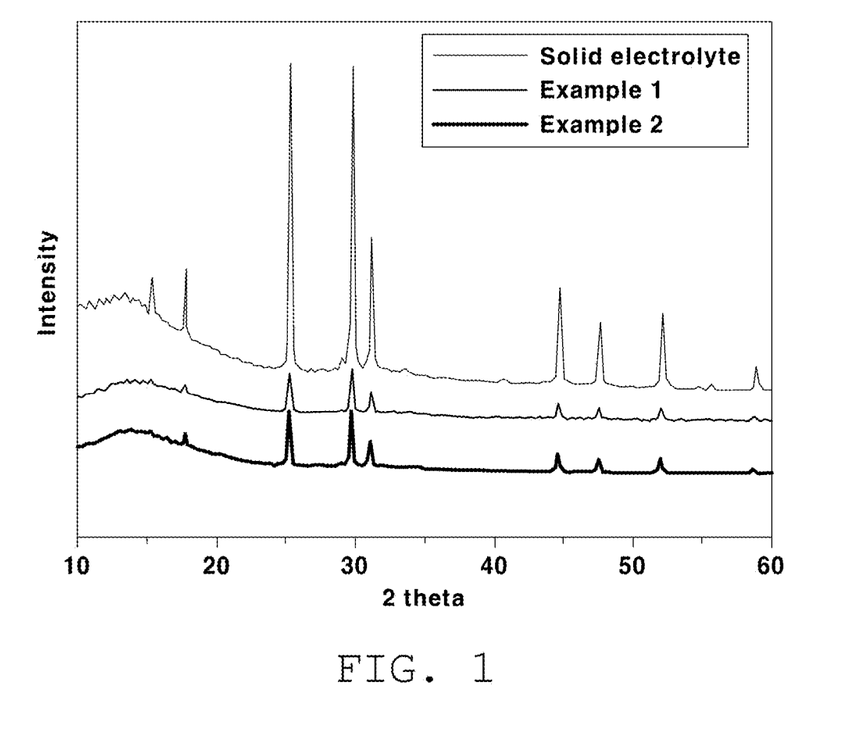
FIG. 1 shows the results of X-ray diffraction of a solid electrolyte membrane, a cathode of Example 1, and a cathode of Example 2.
Figure 2:
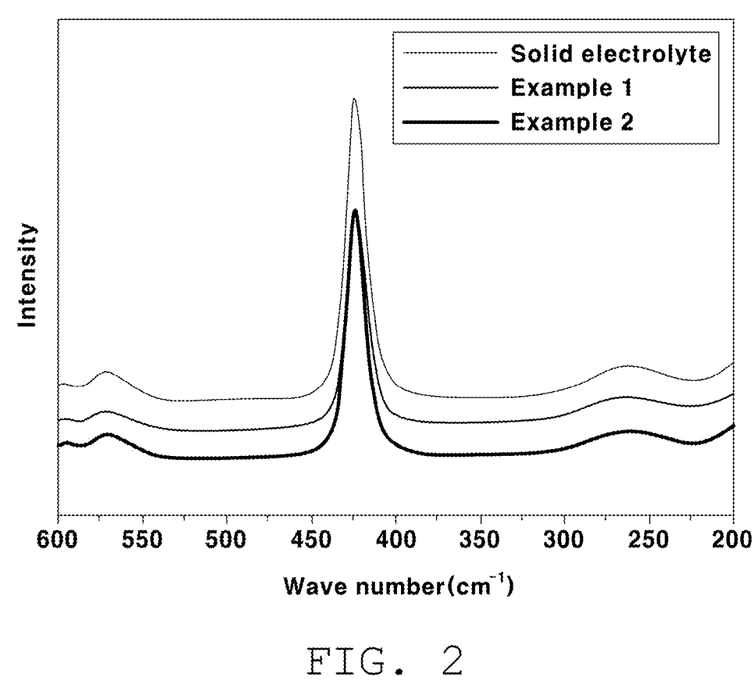
FIG. 2 shows the results of Raman spectroscopy of the solid electrolyte membrane, the cathode of Example 1, and the cathode of Example 2.

With reference to FIGS. 1 and 2, it can be seen that the peak of the solid electrolyte contained in the cathode of Example 1 and Example 2 and the peak of the solid electrolyte membrane coincided with each other. This means that, in the cathode of Example 1 and Example 2, a chemical reaction did not occur between the binder composition and the solid electrolyte despite heat treatment performed during the manufacturing process thereof. Therefore, it is concluded that the binder composition according to the present disclosure does not react with the solid electrolyte and is present in a stable state.

Test Example 2

The lithium ionic conductivity of each of the all-solid-state batteries of Example 1, Example 2, and Comparative Example 1 to Comparative Example 3 was measured. The results thereof are shown in Table 1 below.

TABLE 1

| No. | Example 1 | Example 2 | Comparative Example 1 | Comparative Exampl 2 | Comparative Example 3 |
|---|---|---|---|---|---|
| Ionic conductivity [S/cm] | $1.7 \times 10^{-3}$ | $1.5 \times 10^{-3}$ | $2.8 \times 10^{-3}$ | $2.7 \times 10^{-3}$ | $1.1 \times 10^{-3}$ |

Also, a bending test was performed on the all-solid-state batteries of Example 1, Example 2, and Comparative Example 1 to Comparative Example 3. Specifically, the bending test was performed using a Mandrel bending machine using a cylinder having a diameter of 7 mm. The results thereof are shown in Table 2 below.

TABLE 2

| No. | Example 1 | Example 2 | Comparative Example 1 | Comparative Example 2 | Comparative Example 3 |
|---|---|---|---|---|---|
| Bending test results | Good electrode state | Good electrode state | Broken electrode | Broken electrode | Good electrode state |

Figure 3:
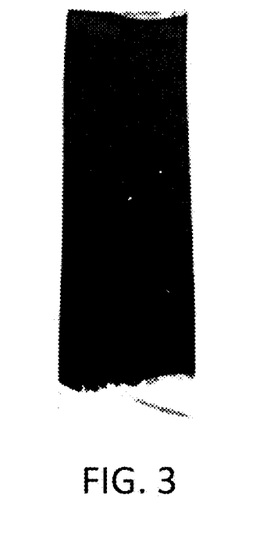
FIG. 3 is a photograph showing the cathode of an all-solid-state battery of Example 1 subjected to a bending test.
Figure 4:
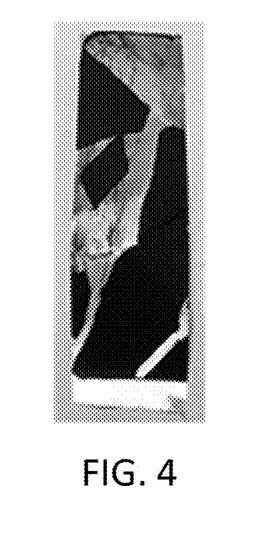
FIG. 4 is a photograph showing the cathode of an all-solid-state battery of Comparative Example 1 subjected to a bending test.

FIG. 3 is a photograph showing the cathode of the all-solid-state battery of Example 1 subjected to the bending test. FIG. 4 is a photograph showing the cathode of the all-solid-state battery of Comparative Example 1 subjected to the bending test.

As is apparent from the results of Tables 1 and 2, the all-solid-state batteries of Example 1 and Example 2 exhibited desirable lithium ionic conductivity and were flexible. However, Comparative Example 1 and Comparative Example 2 showed low flexibility, and Comparative Example 3 showed low lithium ionic conductivity.

Test Example 3

A peel strength test was performed on the all-solid-state batteries of Example 1, Example 2, and Comparative Example 1 to Comparative Example 3. Specifically, the peel strength test was performed through a 180° peel test method using a universal testing machine. The results thereof are shown in FIGS. 5 and 6.

Figure 5:
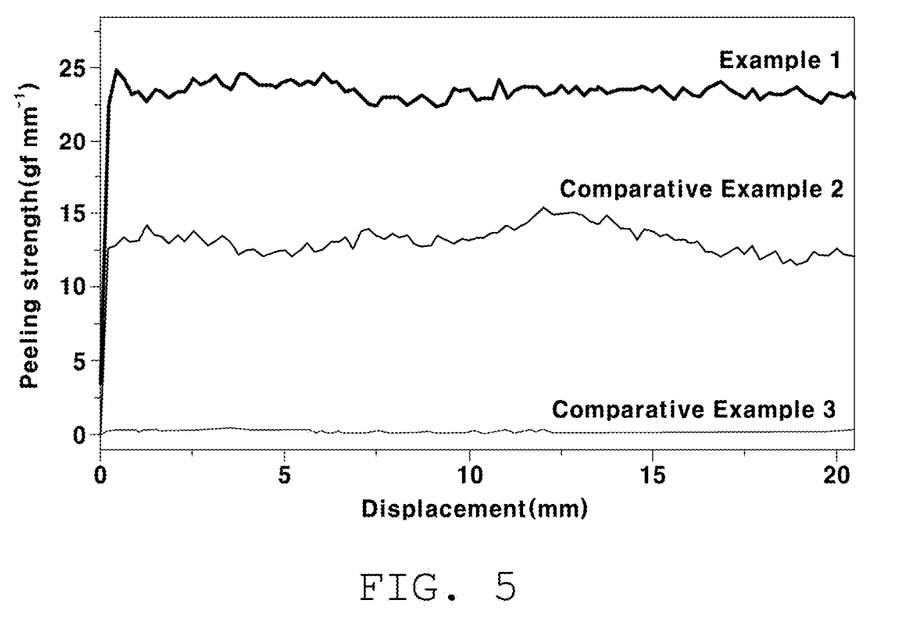
FIG. 5 shows the results of measurement of 180° peel strength depending on the displacement of the all-solid-state battery of each of Example 1, Comparative Example 2 and Comparative Example 3.
Figure 6:
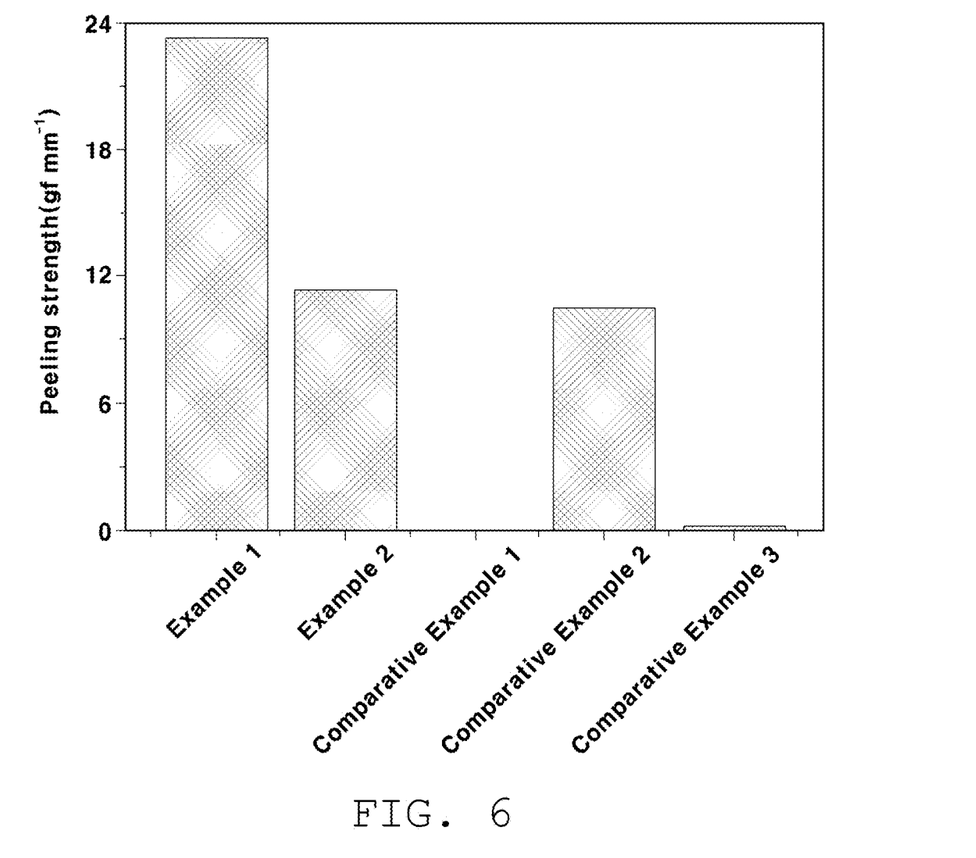
FIG. 6 shows the results of measurement of maximum peel strength of the all-solid-state battery of each of Example 1, Example 2 and Comparative Example 1 to Comparative Example 3.

FIG. 5 shows the results of measurement of 180° peel strength depending on the displacement of the all-solid-state batteries of Example 1, Comparative Example 2 and Comparative Example 3. FIG. 6 shows the results of measurement of maximum peel strength of the all-solid-state batteries of Example 1, Example 2, and Comparative Example 1 to Comparative Example 3.

In Comparative Example 1, the flexibility of the electrode was low and thus the electrode was broken during the peel strength test, so measurement was impossible. In Comparative Example 2, the flexibility of the electrode was low and the binder composition had no elasticity, and thus adhesion was low compared to Examples 1 and 2. In Comparative Example 3, it was confirmed that adhesion between electrode materials was very low due to the use of the butadiene rubber binder having low polarity.

In contrast, in Example 1 and Example 2, it was confirmed that both the polar functional group and the rubber-based functional group were present in the molecular structure, so both the binding strength between the binder and the electrode material and the flexibility of the electrode were excellent, and adhesion of the electrode was enhanced due to the elasticity of the binder composition.

Test Example 5

A charge/discharge test was performed on the all-solid-state batteries of Example 1, Comparative Example 2 and Comparative Example 3. The charge/discharge test was performed through a constant-current constant-voltage (CCCV) method. The results thereof are shown in FIG. 7.

Figure 7:
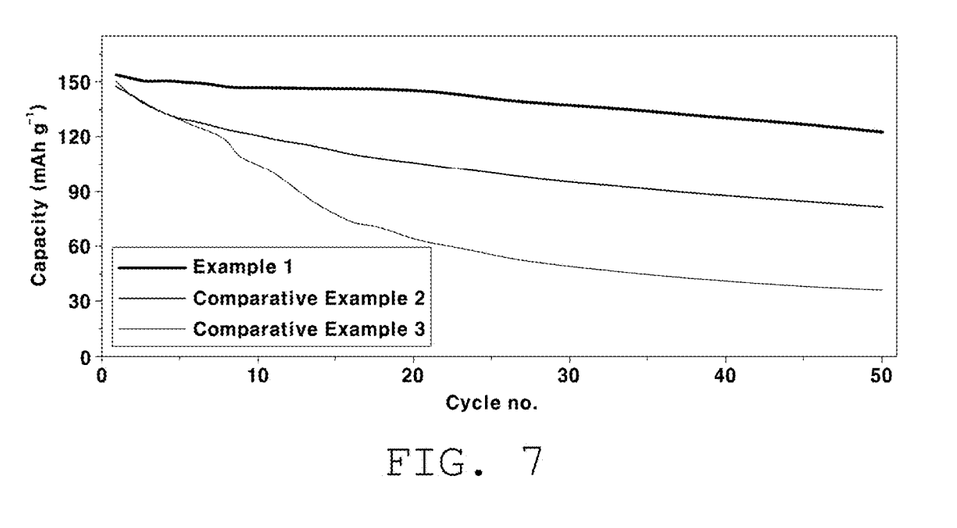
FIG. 7 is a graph showing discharge capacity depending on the number of cycles of the all-solid-state batteries of Example 1, Comparative Example 2 and Comparative Example 3.

FIG. 7 is a graph showing discharge capacity depending on the number of cycles of the all-solid-state batteries of Example 1, Comparative Example 2 and Comparative Example 3. With reference thereto, in Example 1, it was confirmed that binding between the electrode materials in the electrode before and after charging and discharging was maintained at a high level due to enhanced adhesion, and the discharge capacity was improved compared to Comparative Example 2 and Comparative Example 3.

In particular, in Comparative Example 3, it was confirmed that the binding of the electrode material with the binder was insufficient during the process of increasing and decreasing the volume of the electrode material before and after charging and discharging, and thus the contact between the electrolyte and the active material was remarkably deteriorated and the lowest discharge capacity was exhibited.

Although specific forms of the present disclosure have been described with reference to the accompanying drawings, those skilled in the art will appreciate that the present disclosure may be provided in other specific forms without changing the technical spirit or essential features thereof. Thus, various forms described above should be understood to be non-limiting and illustrative in every way.

What is claimed is:

1. A binder composition for an all-solid-state battery, the binder composition comprising:

a first polymer comprising a repeating structure represented by Chemical Formula 1a below:

[Chemical Formula 1a]

and
a second polymer comprising diene-based rubber,
wherein in Chemical Formula 1a, $R_1$ comprises hydrogen, a halogen element or a C1-4 alkyl group, $R_2$ comprises an unsubstituted C1-4 alkyl group or an ether group in which a portion of carbon atoms of the alkyl group is substituted with oxygen, and m is an integer of 40 to 2,000,
wherein the diene-based rubber comprises at least one selected from a group consisting of 1,4-polybutadiene, 1,2-polybutadiene, and combinations thereof,
wherein the first polymer and the second polymer are copolymerized, wherein the binder composition is represented by Chemical Formula 3 below:

[Chemical Formula 3]

and
wherein in Chemical Formula 3, m is an integer of 40 to 2,000, and n is an integer of 1,500 to 15,000.

2. The binder composition of claim 1, comprising:
50 wt % or less but exceeding 0 wt % of the first polymer; and
50 wt % to less than 100 wt % of the second polymer.

3. The binder composition of claim 1, wherein 50 mol % or less but exceeding 0 mol % of the first polymer and 50 mol % to less than 100 mol % of the second polymer are copolymerized.

4. The binder composition of claim 1, wherein the first polymer and the second polymer are block copolymerized.

5. An electrode slurry for an all-solid-state battery, the electrode slurry comprising:
a binder solution comprising a binder composition and a solvent;
an electrode active material;
a conductive material; and
a solid electrolyte,
wherein the binder composition comprises:
a first polymer comprising a repeating structure represented by Chemical Formula 1a below:

[Chemical Formula 1a]

and
a second polymer comprising diene-based rubber,
wherein in Chemical Formula 1a, $R_1$ comprises hydrogen, a halogen element or a C1-4 alkyl group, $R_2$ comprises an unsubstituted C1-4 alkyl group or an ether group in which a portion of carbon atoms of the alkyl group is substituted with oxygen, and m is an integer of 40 to 2,000,
wherein the diene-based rubber comprises at least one selected from a group consisting of 1,4-polybutadiene, 1,2-polybutadiene, and combinations thereof, and
wherein the first polymer and the second polymer are copolymerized.

6. The electrode slurry of claim 5, wherein the solvent comprises at least one selected from a group consisting of butylate, toluene, xylene, anisole, hexane, heptane, dibromomethane, dichloroethane, dichlorohexane, ethanol, glycol ether, and combinations thereof.

7. The electrode slurry of claim 5, wherein the binder solution comprises:

2.5 wt % to 45 wt % of the binder composition; and 97.5 wt % to 55 wt % of the solvent.

8. The electrode slurry of claim 5, comprising 0.1 wt % to 10 wt % of the binder solution, 75 wt % to 95 wt % of the electrode active material, 1 wt % to 10 wt % of the conductive material, and 5 wt % to 25 wt % of the solid electrolyte.

9. A method of manufacturing an electrode for an all-solid-state battery, the method comprising:

preparing a binder solution comprising a binder composition and a solvent;

manufacturing an electrode slurry by mixing the binder solution, an electrode active material, a conductive material and a solid electrolyte; and forming an electrode by applying the electrode slurry on a substrate and performing heat treatment, wherein the binder composition comprises:

a first polymer comprising a repeating structure represented by Chemical Formula 1a below:

[Chemical Formula 1a]

and a second polymer comprising diene-based rubber, wherein in Chemical Formula 1a, $R_1$ comprises hydrogen, a halogen element or a C1-4 alkyl group, $R_2$ comprises an unsubstituted C1-4 alkyl group or an ether group in which a portion of carbon atoms of the alkyl group is substituted with oxygen, and m is an integer of 40 to 2,000, wherein the diene-based rubber comprises at least one selected from a group consisting of 1,4-polybutadiene, 1,2-polybutadiene, and combinations thereof, and wherein the first polymer and the second polymer are copolymerized.

10. The method of claim 9, wherein the applied electrode slurry is heat-treated at a temperature of 100° C. to 250° C. for 1 min to 15 hr.

* * * * *